United States Patent [19]
Klausner et al.

[11] Patent Number: 5,283,818
[45] Date of Patent: Feb. 1, 1994

[54] TELEPHONE ANSWERING DEVICE LINKING DISPLAYED DATA WITH RECORDED AUDIO MESSAGE

[75] Inventors: Judah Klausner, Sagaponack, N.Y.; Robert Hotto, La Jolla, Calif.

[73] Assignee: Klausner Patent Technologies, Sagaponack, N.Y.

[21] Appl. No.: 860,699

[22] Filed: Mar. 31, 1992

[51] Int. Cl.$^5$ .................. H04M 1/64; H04M 11/00; H04M 15/06

[52] U.S. Cl. .................................... 379/67; 379/88; 379/89; 379/96; 379/142; 379/199

[58] Field of Search ................ 379/67, 88, 89, 96, 379/97, 70, 142, 74, 199, 77

[56] References Cited

U.S. PATENT DOCUMENTS

| | | |
|---|---|---|
| D. 299,716 | 2/1989 | Weisz et al. . |
| D. 316,024 | 4/1991 | Sharbaugh . |
| D. 327,063 | 6/1992 | Panzer . |
| 4,241,238 | 12/1980 | Strand . |
| 4,304,968 | 12/1981 | Klausner ............... 379/142 |
| 4,477,807 | 10/1984 | Nakajima et al. . |
| 4,511,764 | 4/1985 | Nakayama et al. . |
| 4,517,410 | 5/1985 | Williams et al. . |
| 4,600,809 | 6/1986 | Tatsumi et al. . |
| 4,612,416 | 9/1986 | Emerson et al. . |
| 4,776,002 | 10/1988 | Kammerl . |
| 4,782,510 | 11/1988 | Szlam . |
| 4,790,003 | 12/1988 | Kepley et al. . |
| 4,802,202 | 1/1989 | Takahashi et al. . |
| 4,803,717 | 2/1989 | Marui . |
| 4,805,207 | 2/1989 | McNutt et al. . |
| 4,829,559 | 5/1989 | Izawa et al. . |
| 4,850,005 | 7/1989 | Hashimoto ............... 379/88 |
| 4,853,952 | 8/1989 | Jachmann et al. ............... 379/88 |
| 4,860,339 | 8/1989 | D'Agosto, III et al. ............... 379/67 |
| 4,894,861 | 1/1990 | Fujioka . |
| 4,916,730 | 4/1990 | Hashimoto . |
| 4,924,496 | 5/1990 | Figa et al. . |
| 4,930,152 | 5/1990 | Miller . |
| 4,935,954 | 6/1990 | Thompson et al. . |
| 4,961,216 | 10/1990 | Baehr et al. . |
| 5,003,575 | 3/1991 | Chamberlin et al. . |
| 5,050,206 | 9/1991 | Shimanuki . |
| 5,163,082 | 11/1992 | Karnowski . |

Primary Examiner—James L. Dwyer
Assistant Examiner—Fan Tsang
Attorney, Agent, or Firm—Darby & Darby

[57] ABSTRACT

A telephone answering device (TAD) which includes a means of intelligently organizing voice messages, associated entered codes such as personal IDs and home telephone numbers, and information stored in the memory of the TAD. These codes or numbers are decoded by means of the caller entering DTMF signals into the telephone which are recognized, recorded and processed by the TAD. When processed with codes and personal information previously entered into the device's memory, the TAD displays the identity of the callers for each message, thus providing a menu of choices, i.e., a list of callers. This enables the user to access messages in a selective manner based on the identity of the caller. The need to listen to the actual voice messages to determine the caller's identity and the need to listen to the messages sequentially or chronologically is obviated, saving both time and effort. Additionally, because the voice message is also linked to pre-stored additional data in the data base, when hearing a message, one also can view relevant associated information, such as a fax number, etc., that might not have been left in the audio message but might be important.

14 Claims, 7 Drawing Sheets

MEMORY SECTION 1

1. THORNTON ALUCKET - 417-6832(H), 371-6288(O), 230 WEST RD., FAIRVIEW CITY. VICE PRESIDENT RLB CORP.
2. SID CAESER - 497-6201(H) 331-2677 (P), ROCKWELL DRIVE #34, PISTON LAKES, BIRTHDAY 11/17/16
3. PAT DOBBS - 661-4199(O), 817-312(H)
4. LUCY FROCK - 637-4064(H), 12 E 9 ST. N.Y.C. 229-8019(F)
5. FRAN GRILLARD - 729-6555(H), 219-8663(O), 919-3342(F) 407 NEWTON LANE, PIANO TUNER
6. REGIS LAMB - 431-9762(H) 211-0162(M), 431-2400(O), 684-3199(F),34 E. 6 ST.

Fig. 6

MEMORY SECTION 2

MEMORY SECTION 3

1. "PLEASE DIAL IN YOUR PHONE NUMBER ON A TOUCH TONE PHONE AND THEN LEAVE A MESSAGE. THANK YOU."
2. "HI, THIS IS SID; PLEASE BRING THE YELLOW BALLOONS WHEN YOU COME OVER TONIGHT."
3. "MS DOBBS HERE. I'LL BE IN MY OFFICE TILL 5:30, THEN AT HOME."
4. "YOUR FRIEND ALICE. SEE YOU LATER TONIGHT."
5. "THIS IS MR. LAMB. I'LL BE IN MY CAR UNTOL ABOUT 4:00 P.M. . . . . .

Fig. 8

1. SID CEASER - 497-6201
2. PAT DOBBS - 661-4199
3. ALICE POOB - 786-5035
4. REGIS LAMB - 431-9762
5. MARY PRESTO - 382-6579
6. WILLY SMITH - 887-7200

Fig.9

REGIS LAMB
HOME # 431-9762
MOBILE # 211-9762
OFFICE # 431-2400
FAX # 684-3199
34 E. 6 ST.

Fig.10

TELEPHONE ANSWERING DEVICE LINKING DISPLAYED DATA WITH RECORDED AUDIO MESSAGE

FIELD OF THE INVENTION

The present invention relates to a device for recording and recalling messages received through telecommunication. More specifically, the invention relates to a telephone answering device that displays information about messages recorded within the device and provides selective access to those messages based on the displayed information.

BACKGROUND OF THE INVENTION

Most everyone is well acquainted with the standard telephone answering machine. Such a machine is hooked up to a telephone and by means of a tape recorder device and magnetic tape, it records oral messages from the caller. While such a machine has the advantage of allowing the user to receive messages when he is not present and cannot answer the phone, it has several disadvantages:

(1) The owner of the machine must play back many minutes of taped voice messages just to know who has called. (2) The owner can not intelligently search for a specific caller's recorded message. (3) To retain a list for later callback after listening to messages, the owner must either keep tape unerased, or must copy down the list with a pen and paper. (4) The caller must speak his name, phone number, etc. into his phone in order for the message to be transmitted through the phone system and recorded on the answering machine on the other end of the line. Since many callers feel uncomfortable talking to machines, some callers don't leave messages and merely hang up the phone. (5) An additional inconvenience occurs when the user wishes to retrieve stored messages by phone. He must on occasion hang on the phone for many minutes for all recorded voice messages to be played in their entirety and must copy with pen and paper in order to have a hard copy. This is not only inconvenient, but may be quite costly, particularly if the call to retrieve messages is a long distance call and the user is interested in a particular message that is preceded by a number of lengthy, less interesting, voice messages.

A partial solution to many of these disadvantages was offered by the "Telephone Electronic Answering Device" (TEAD) by the present inventors, disclosed in U.S. Pat. No. 4,304,968, which is incorporated herein by reference. The TEAD is capable of receiving and storing messages such as the callers' names and telephone numbers and times of receipt of such messages by converting dual tone-touch tone frequencies (DTMF) or rotary dial pulses, generated by the caller dialing his own phone number, into proper digital data representing the caller's phone number and indicating the caller's name if pre-stored in memory by the user. The entire pre-stored message could then be retrieved and displayed on command on a display provided on the TEAD or printed out to provide a permanent record.

The message stored by the TEAD, however, is limited. It only includes information pre-stored in its internal memory that is associated with a caller's phone number, or, in some instances, only the caller's number and the time of day. It is known that in many environments, caller's wish to leave more information in their messages, such as the urgency of the call. In many cases, a return call is not necessary if a simple descriptive message is left. With the TEAD, the user would have to call back the caller to get any such message in person, wasting effort and telephone line charges. The TEAD does provide some mechanism for leaving slightly more information by selecting from a limited menu of messages, such as "Urgent," but playing that menu for the caller takes time and the menu choices will only cover a very few limited choices of the messages that callers actually want to leave.

Also currently available are voice mail systems, which organize voice messages according to the called party. Each stored message is associated with one or more persons that are service members of the voice mail system. Each voice message to a called party is then organized sequentially in a chronological order as in the prior art sequential tape recording answering devices. These voice mail systems lack the ability to access a voice message selectively by name, since there is no way a user can determine the identity of any of the callers without listening to the messages.

It is also known that digital recording of voice messages can be used to replace the magnetic tape, but again selective accessing of a particular individual's messages in selective order is not possible.

SUMMARY OF THE INVENTION

Thus, it is an object of the invention to provide a telephone answering device ("TAD") that allows visual identification of callers, identities and selective access to their linked recorded voice messages.

It is a further object that the TAD provide a link between each recorded voice message and personal information pre-stored in data base memory related to that caller.

It is a further object of the invention to provide a TAD that displays a list of all caller displays such list so that the user may selectively access the voice message associated with a given caller without having to listen to all preceding voice messages.

In accordance with the objects of the invention, a telephone answering device is provided which includes a means of intelligently organizing voice messages, associated entered codes such as personal IDs and home telephone numbers, and information stored in the memory of the TAD. These codes or numbers are decoded by means of the caller entering DTMF signals into the telephone which are recognized, recorded and processed by the TAD. When processed with codes and personal information previously entered into the device's memory, the TAD displays the identity of the caller for each message, thus providing a menu of choices in the form of a list of the callers names. This enables the user to access individual messages in a selective manner based on the identity of the caller. The need to listen to the actual voice messages to determine the caller's identity and the need to listen to the messages sequentially or chronologically is obviated, saving time and effort. Additionally, the voice message is also linked to pre-stored additional data in the data base. Thus, when hearing a message, one also can view relevant associated information, such as a fax number, alternate phone number, etc., that might not have been left in the audio message but might be important.

BRIEF DESCRIPTION OF THE DRAWINGS

The above and other objects and advantages will become apparent to those skilled in the art upon reviewing the detailed description of the preferred embodiments in conjunction with a review of the appended drawings, in which:

FIG. 6 is a chart illustrating the contents of a first memory section of the invention;

FIG. 7 is a chart illustrating the contents of a second memory section;

FIG. 8 is a chart illustrating the contents of a third memory section;

FIG. 9 is an illustration of the display of the invention, listing received calls;

FIG. 10 is an illustration of the display recalling information linked to one of the callers.

DETAILED DESCRIPTION OF THE PREFERRED EMBODIMENTS

Figure 1:
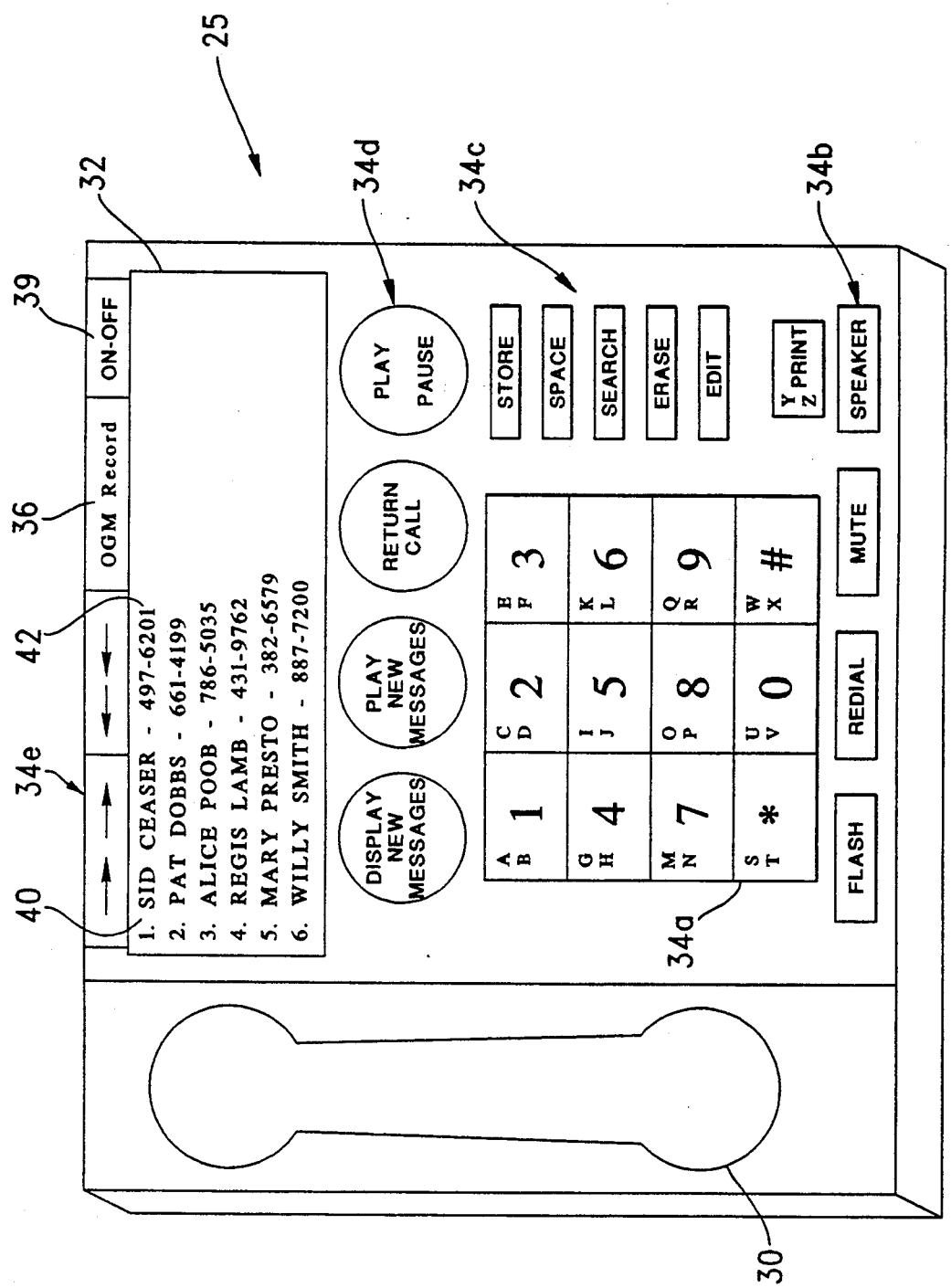
FIG. 1 is a front perspective view of a telephone answering device according to the present invention.

FIG. 1 illustrates the front perspective view of a telephone answering device (TAD) 25 according to the invention. The TAD preferably includes a standard telephone handset 30 having a microphone and speaker for audio communication with a user. The remainder of the TAD preferably includes a display/touch screen 32 and various keys 34 used to activate functions of the TAD. Some of the keys 34a are arranged as a numeric keypad, similar to standard touch-tone telephones. This allows the TAD to be used as a standard telephone, as well as providing access to alphanumeric input by the user. Another set of keys 34b below the numeric keypad includes other standard telephone functions, such as flash, redial, mute and speaker, which allows audio communication without the handset, as is known.

A third set of keys 34c are used for access to a stored database within the TAD that contains information about callers, as described more fully below. Inputting the information to the database is accomplished similarly to the disclosure of the inventor's above-mentioned U.S. Pat. No. 4,304,968. A fourth and fifth set of keys 34d,34e are used for accessing identification data about recorded messages and then accessing and retrieving those messages. A key 36 for recording the outgoing message of the TAD is included, as is a standard "on-off" key 38. All of these keys 34a-e,36,38 and their functions are described more fully below with respect to the preferred embodiment.

The display/touch screen 32 is shown in a state when several messages have been received and recorded by the TAD. The display preferably indicates the identity 40 and phone number 42 of the callers who recorded the messages, this information preferably being retrieved from the database as described more fully below. Through actuation of the touch screen 32 or keys 34d,34e, it is possible to playback any of the voice messages left by the displayed callers, in any sequence, and to perform other functions, such as automatically dialing the particular caller's number to return the call, as described more fully below.

By creating an internal link between the recorded voice message and stored digital database data, an intelligent organized voice/data message (IOVDM) is formed that can be displayed with alphanumeric information, played back as analog recorded voice, processed in a database, etc.

Figure 2:
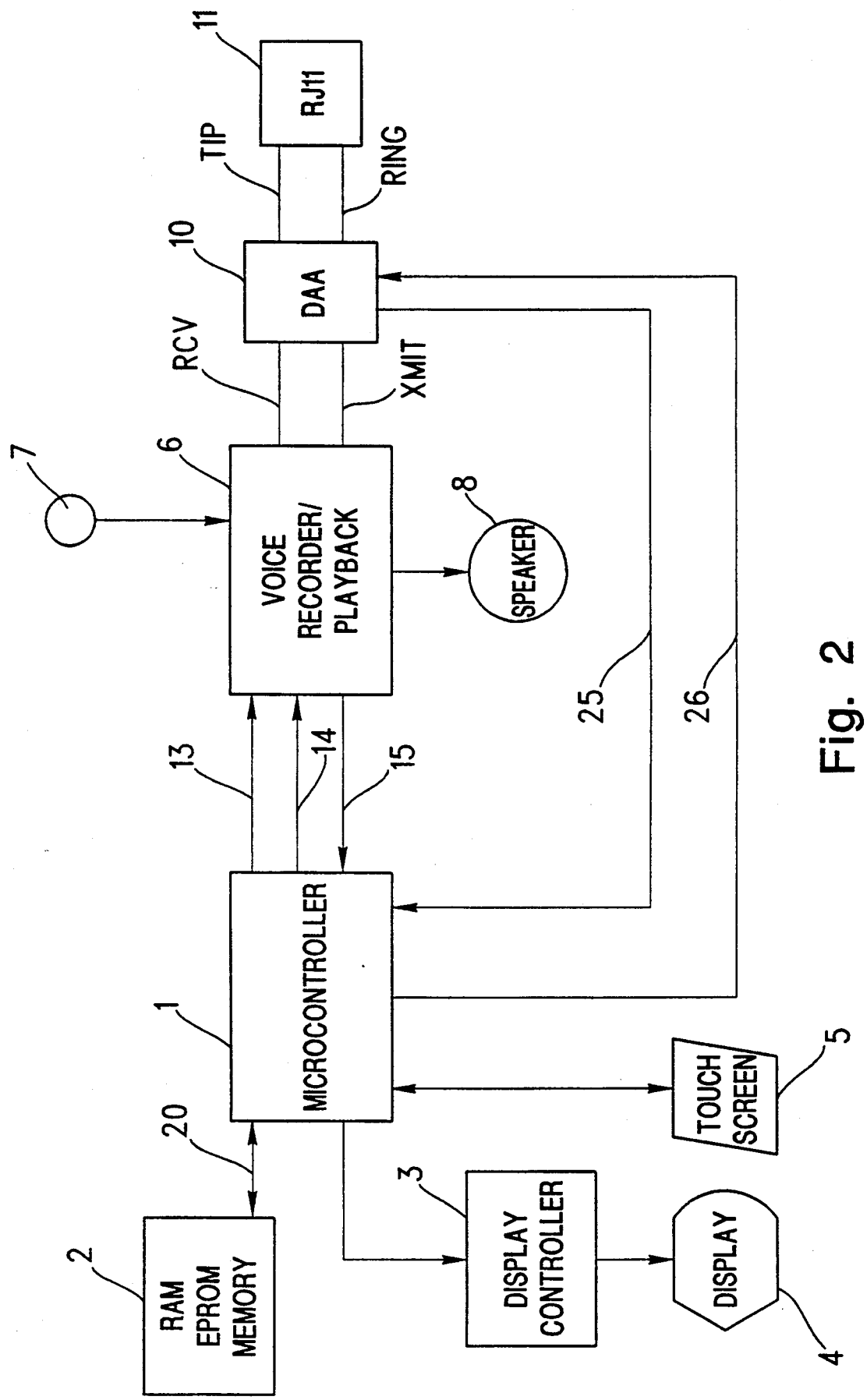
FIG. 2 is a block diagram illustrating the major functional circuit blocks and their connections of the TAD.

FIG. 2 illustrates the block diagram of the circuit elements comprising an embodiment of the present invention.

The microcontroller 1 is preferably a 68HC11, manufactured by Motorola Semiconductor. The microcontroller internally is comprised of memory 2 containing RAM memory and EPROM memory circuits that are known to those skilled in the art. The RAM memory functions as read/write memory used for string data and temporary system status events of the microcontroller. In the present invention, the RAM memory of the microcontroller 1 is also used for the storage of telephone numbers, names, user identification codes and voice messages. Similarly, the EPROM memory stores the program instructions for the control and operation of the microcontroller. These circuit elements are organized and connected in a data/address and control circuit bus structure 20, the general structure of which is known in the art.

The display controller 3 is a known circuit that converts data and control signals from the microcontroller unit into video signals that produce character and graphic information on the display unit 4. The display controller 3 is preferably a circuit comprising the Signetics 2670, 2672 and 2673 CRT controller integrated circuit set. The display controller 3 drives the display unit 4 to produce visual display output with character and/or graphic indicia to be presented to the user.

The display unit 4 is overlaid with a touch screen 5, such as that available from Microtouch, Wilmington, Mass. The touch screen 5 is an input device that presents an X-Y positional coordinate pair to the microcontroller 1 indicating the position touched on the screen 5. Through the use of software within the microcontroller memory, the touch screen is positionally mapped onto the underlying indicia, allowing the user to select or indicate information and functions displayed on the display unit 4.

The speech recorder/playback and DTMF transceiver circuit 6 is preferably comprised of the DS2271DK speech recorder/playback board manufactured by Dallas Semiconductor, Dallas, Tex. Illustrated in FIG. 2 is the microphone input 7 and the speaker output 8 interfaced to the speech recorder/playback circuit 6 which enables the user to record and playback voice messages.

The function of the voice record/playback circuit 6 is to record voice messages into and from the memory 2, and to later play back these voice messages. Other functions of the circuit 6 include DTMF decoding, line status determination and DTMF generation. The messages are recorded either through the microphone unit 7, which is intended for the recording of the outgoing message, or through the data access arrangement circuit (DAA) 10 that interfaces tip and ring lines to a standard RJ11 jack 11, which is preferably connected to a line on the public telephone line. The voice playback function provides an output voice signal either through the speaker 8 or through the DAA 10 connected to the telephone line. The DAA 10 is preferably the CH1840 manufactured by Cermetek Microelectronic Company, Sunnyvale, Calif.

The DAA 10 also provides a signal indicating the incoming ring signal status to the microcontroller 1 via wire connection 25 as illustrated. After a preprogrammed number of ring signals, which may be adjustable, the TAD answers the call by providing a signal on line 26. This line, which is connected to the DAA 10 causes the DAA 10 to put the telephone line in the off-hook state, thereby causing the TAD to answer the call.

Voice signals are transmitted to and from the telephone line through the RJ11 connector 11 and pass through the DAA 10 to the voice recorder/playback circuit on RCV and XMIT lines. This voice signal is in analog form when inputted to the voice recorder/playback circuit 6. As illustrated, these connections RCV and XMIT are capacitively coupled between the DAA 10 and the voice recorder/playback circuit. The voice signal is preferably digitized and stored in the voice memory section of the memory 2 by means of the recorder/playback circuit 6, although other storage means, such as analog memory circuits, are possible.

The microcontroller 1 controls the functioning of the voice/playback circuit such as with PLAY, RECORD, ERASE, and STOP signals along with the signals corresponding to message numbers.

The PLAY, RECORD, ERASE, and STOP signals to the recorder/playback circuit 6 are received from the microcontroller via the output bus 13 as illustrated. These control functions are activated by means of the microcontroller toggling pins connected to bus 13, and selecting the desired message number through an output port on the microcontroller 1 via the bus connection 14 as illustrated.

The DTMF signals received from the telephone network are decoded as is known by the voice recorder/playback circuit 6. Through the same circuit, the energy level on the telephone line can be detected, indicating to the microcontroller if there is voice signals on the line (varying energy level), DTMF signals (steady, known energy levels), or a dial tone or silence on the line (steady high or low energy level). The determination of the status of the line, in conjunction with the user setup mode provides input to the decision of the next machine operation, as will be illustrated.

System Operation

Figure 3:
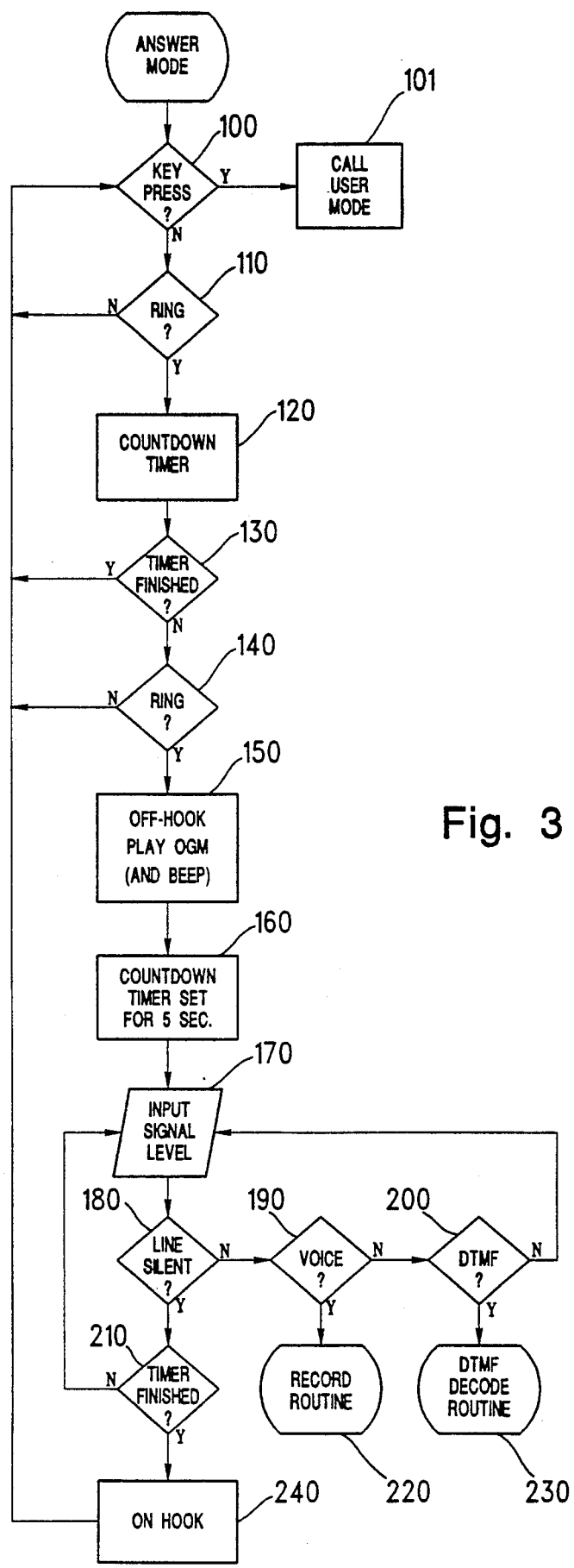
FIG. 3 is a flowchart illustrating the answer mode of the present invention.

FIG. 3 is a flowchart illustrating the answer program mode of the present invention, in which the TAD loops and checks for an incoming call on the telephone line or for the user to activate a key.

As illustrated in FIG. 3, the TAD first determines if the user has pressed a key on the TAD (Decision block 100). This is done by means of the microcontroller reading its RS232 serial data port connected to the touch screen 5 through connection 20 to determine if the screen has been touched. The microcontroller 1 is also connected an monitors the other keys 34a-e on the TAD. If an X-Y coordinate pair is read and the parameters of the X-Y pair map onto the boundaries of a known key, a true key has been depressed and the microcontroller 1 calls the user mode routine (block 101).

If no key has been pressed, the system next tests if a ring signal is available (block 110). If a ring signal is available, determined by reading the state of the DAA 10, the microcontroller then proceeds to block 120 in which it reads the variable stored in memory indicating the number of rings to wait before answering the incoming call (INC). The microcontroller then preferably multiplies this number by 6 (a standard ring is 2 seconds with a 4 second silence gap) and counts down that number of seconds before answering.

As illustrated, during this delay, the microcontroller checks every 6 seconds to determine if the ringing has stopped. If no ring is present, this indicates that the caller hung up. The microcontroller would then return to block 100. If the timer successfully counts down, the system progresses into the outgoing message state (block 150).

The microcontroller causes the DAA to create an off-hook state and then causes the voice/recorder playback circuit 6 to transmit the pre-recorded outgoing message (OGM) through the DAA to the telephone line. The OGM is preferably stored as message #1 in memory 2. As described below, the OGM would include instructions for the caller to enter a home phone number or other caller identifying information.

When the playing of the OGM is completed, the microcontroller preferably waits 5 seconds (block 160). This 5 second grace period prevents malfunction of the TAD due to silence by the natural pause or hesitation of a caller before or during enunciation of a message. At block 170, the microcontroller determines if voice or DTMF signals are being transmitted. The microcontroller can distinguish three states—voice signals, DTMF signals, or silence—by reading the level and modulation of the signals on the telephone line. The DS2271DK voice recorder/playback unit can distinguish between the tones of DTMF signals and the signal level ranges associated with human speech detected on the telephone line. If voice signals are transmitted, the microcontroller executes the voice record routine. If no voice is present on the line, but DTMF signals are being transmitted, the microcontroller executes the DTMF decode routine.

If, however, there is silence on the telephone line for 5 seconds, the microcontroller then causes the DAA to go into the on-hook mode (block 240), thereby hanging up from the call. The TAD now returns to its initial state in the answer mode routine of looping and checking for a user key touch and waiting for a ring signal.

The process for determining line silence, voice energy or DTMF signaling is illustrated in blocks 180, 190 and 200. If block 190 is true (voice energy present), program execution follows to block 220, the record routine If, however, there is a DTMF tone present, execution follows to block 230, the DTMF decode routine.

Figure 4:
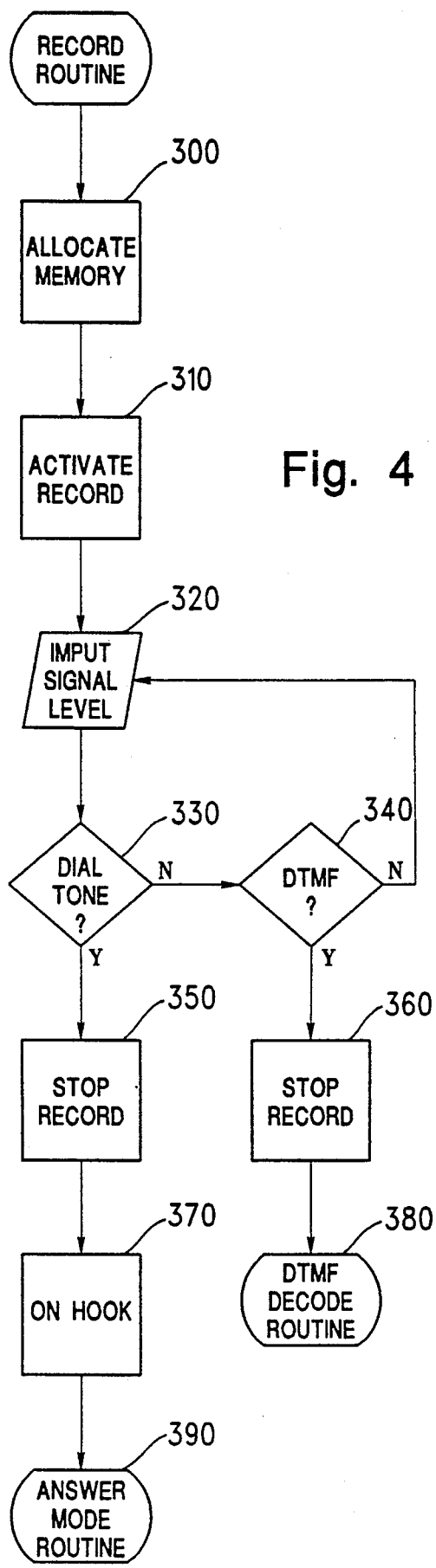
FIG. 4 is a flowchart illustrating the record mode of the present invention.

Block 220, the record function, is illustrated in FIG. 4 and begins with the allocation of voice memory and data memory at block 300. This function increments a memory variable stored in EPROM that points to the next memory position allocated in the voice memory and data memory stored in memory circuit 2. This process is required in order to organize the data and voice memory and link them together. Memory organization of the TAD is described more fully below.

At block 310, the voice message memory is accessed. The record function is then executed and voice recorder/playback circuit begins digitizing the analog voice and stores this data sequentially in the voice memory 2. The record function is now in process and operating as a parallel task to the task of determining the line status.

At block 320, data is then analyzed at block 330 (is there a dial tone). If this test is false, the block 340 (is there a DTMF tone) is executed.

If both these blocks (330 and 340) generate a false, then control is looped back to block 320, input signal levels, and allows the voice record routine to continue. This looping back will compensate for momentary silence or gaps in the voice message. If block 330 is true, i.e., there is a dial tone, then the voice recording routine is stopped at block 350 and the telephone line is put on-hook at block 370. The TAD then returns to answer mode (shown in FIG. 3) at block 390.

Figure 5:
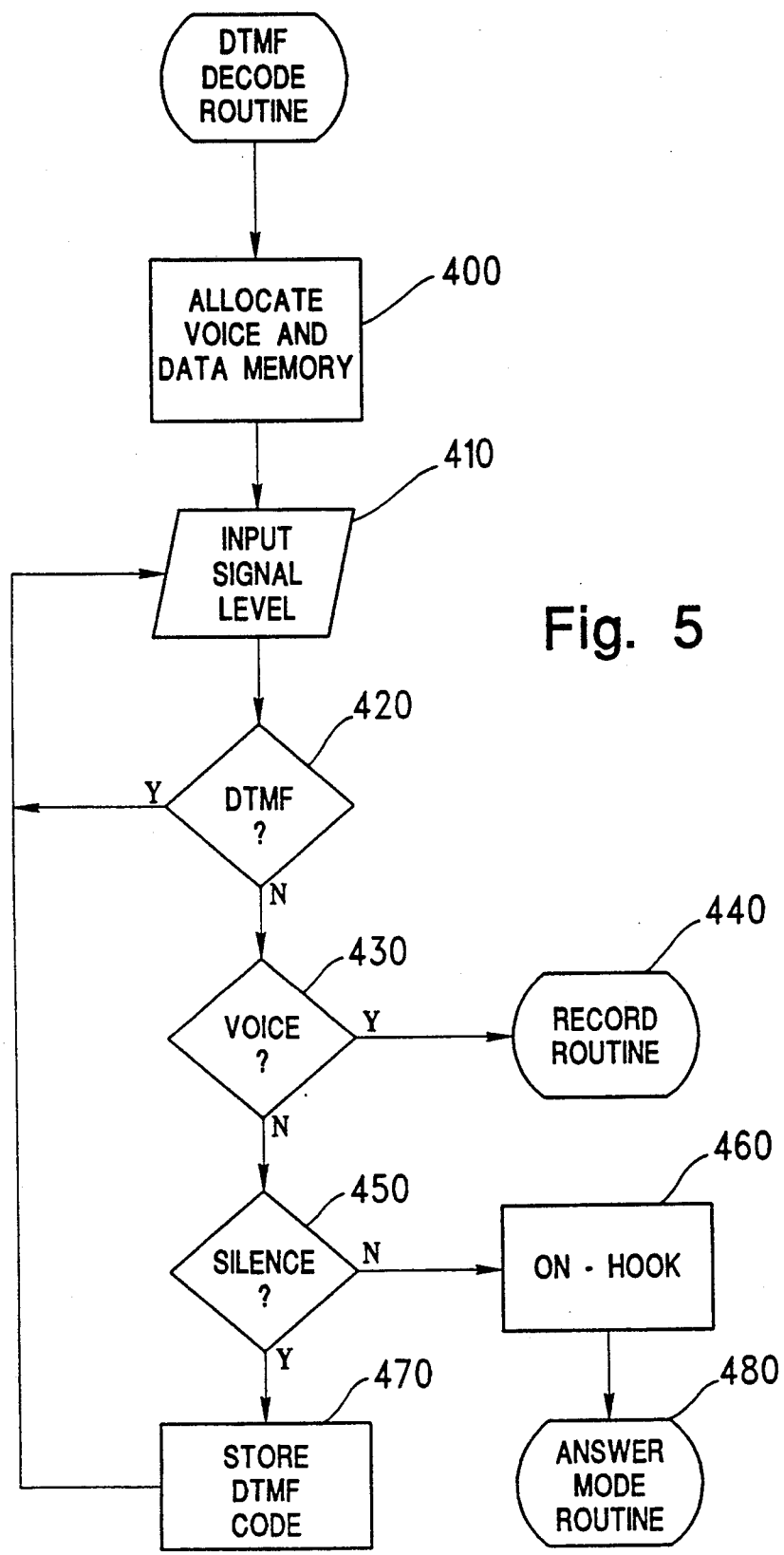
FIG. 5 is a flowchart illustrating the DTMF decode routine of the present invention.

If block 340 is true, then there is a DTMF signal and the record routine is stopped at block 36 and block 380 calls the DTMF decode routine shown in FIG. 5. This routine decodes the DTMF signals keyed into the telephone by the caller and stores the code in memory of the TAD and links it to the voice memory if a voice message is recorded.

Operation is entered to the DTMF decode routine when a DTMF signal is sensed via the input function and begins at block 400 (allocate voice and data memory). This process sets up data memory for receiving the DTMF signaling and links the data memory to voice message memory if a voice message has already been recorded. If a voice message has not yet been recorded it allocates an available message number in case a voice message is left later. This allows the system to be flexible and will allow the user to key in a DTMF I.D. code anytime during the message sequence.

Control proceeds to block 410 to read the levels of the telephone line. At block 420, the microcontroller determines if there is still a DTMF signal on the line.

If block 420 is true, control is looped back to input block 410. This input and test loop continues until the DTMF signal stops indicating either the standard silent interval between DTMF digits or perhaps that the DTMF signaling has been completed and a voice message has been initiated. If decision block 420 generates a false, it is determined at block 430 if a voice signal is present. If a voice signal is present, block 440 passes control back to the record function routine of FIG. 4.

If no voice signal is on the line, block 430 generates a false, and control passes to block 450 in which it is determined if silence or a dial tone is present on the line. Silence indicates an inter-digit silence and control passes to block 470, which stores the decoded DTMF digit and passes control back to block 410 to read the next DTMF digit.

If, however, there is dial tone on the line, indicating that the caller has disconnected, block 450 instead passes control to block 460, which puts the TAD in the on-hook mode and proceeds to block 480. Block 480 passes control to the answer mode routine of FIG. 3. Now, the TAD is ready for a new incoming call or for the user to activate a key function by pressing the touch screen.

Memory Organization

The memory circuit block 2 (FIG. 2) connected to the microcontroller 1 as further illustrated in FIGS. 6,7 and 8 is the storage means where the user options, commands, data and voice messages are stored and interact with the microcontroller unit 1 and the voice record/playback circuit 6 in order to accomplish the features as taught in the present invention.

The data entered by the user for the functioning of the present invention are textual names of the callers as they would appear on the display 4. For example, "Sid Ceaser" with the user's identification code, i.e. 497-6201 as well as additional related data. This data is stored in the memory and organized by the database portion of the programming in memory section illustrated in FIG. 6. The address or relative position of this data in the memory section can change as new names are entered or deleted as controlled and organized by database functions in the microcontroller.

The recorded messages which are entered by the caller can be composed either of 1 or 2 parts, a digital data part and a digitized analog part. The first part, which is the digital data portion, is composed of the data acquired by the DTMF decoding function as illustrated in the flowchart of FIG. 4 and is stored as binary numbers in memory section 2 as illustrated in FIG. 7. As explained, this digital data, which is composed of the translated code as entered by the caller from DTMF keypad, also contains an address link byte to the voice message if the user had also recorded a voice message along with this data message.

The voice message memory as required by the voice record/playback circuit 6 is a separate section of the memory, i.e. memory section 3 as illustrated in FIG. 8.

The voice recorder/playback circuit 6 preferably digitizes and compresses the voice message and presents it to the microcontroller which stores it in a specific format in a separate section (section 3) of memory. The format is preferably composed of 128 byte speech records of which each voice message is composed of an integral number of records. The first byte of each record contains a number specifying which message number it is part of. The valid message numbers are preferably 1 to 254 although more, of course, are possible. Therefore, a preferred maximum of 253 messages exits with message 1 being the OGM. This message number in the record is used to link to the digital data message which contains the same message number.

Therefore, as explained, there are three sections of memory which can be linked together by the database program function to form an intelligent organized voice/data message IOVDM) as taught in the present invention, These memory sections are:

Memory Section 1) The database entry by the user of the names with the associated data, such as telephone number and address, and the caller's I D which could be the caller's home or business telephone number or any unique code. (FIG. 6)

Memory Section 2) The message memory containing caller entered I.D. code data and linked message numbers. (FIG. 7)

Memory Section 3) The message memory containing voice message data recorded by the caller. (FIG. 8)

A message as recorded by the caller can be composed of any of the following types:
1) A voice message alone.
2) A data message alone as described in U.S. Pat. No. 4,304,968 by the inventors of the present invention.
3) A voice message as described in (1) linked to a data message as described in (2) that are linked together into an intelligent organized voice data message (IOVIDM) as taught by the present invention.

The linking together of these separate data memory and voice memory elements in an IOVDM is performed by the database function and displayed on the display. To perform this linking, a reserved byte of memory attached to the data message is stored which indicates the voice message number it is linked to. The database program code then searches the database entry section in which the user entered the data such as name, address and phone number. If a match is found between these, the information is presented to the user as an IOVDM.

Other ways of linking the voice messages and data messages are possible. In one alternate configuration, each data message precedes its corresponding voice message in contiguous memory bytes.

Example of Operation

For proper functioning of the TAD, it is preferred that database information, such as names, phone numbers and address, personal and/or business reference notes, etc. is entered by the user. Using keys 34c for accessing the database, information, such as "Regis Lamb" and his associated phone number "431-9762" plus other additional information may be entered. As seen in FIG. 6, several telephone numbers can be stored for an individual. Preferably, they would be coded, for example, with an "O", "H", "M" or other letters, signifying "office", "home", "mobile", etc. The database can have as many entries as the user desires and the specific memory size will allow. The user preferably also records the OGM, which would preferably include instructions for the caller to enter his home phone number or caller identifying number on a touch tone phone and then to record a voice message.

It is to be understood that any incoming signals over the telephone line with a voice message that is recognizable by the TAD and is generally unique to the caller may be used instead of DTMF tones.

Figure 11:
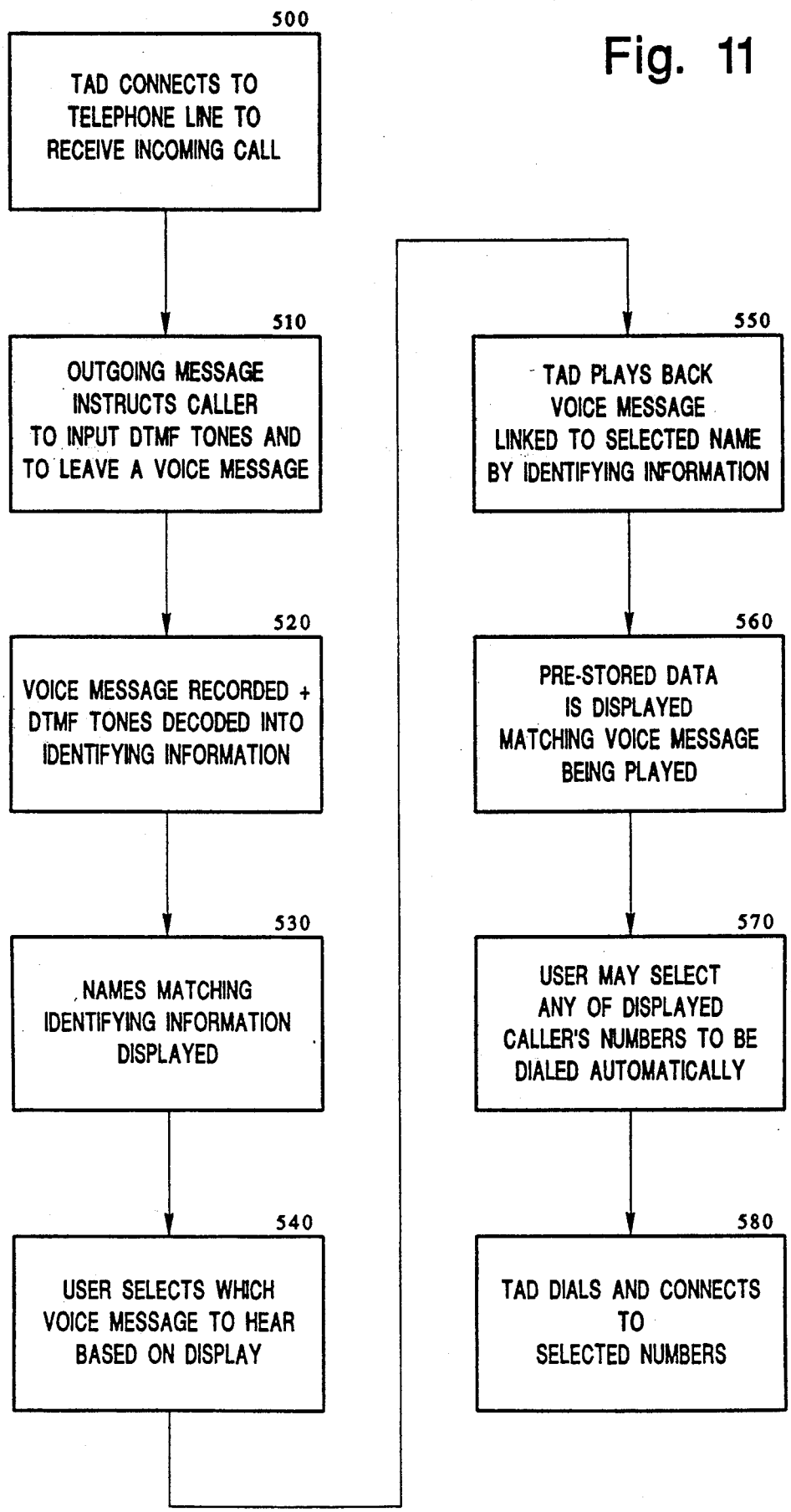
FIG. 11 is a flowchart illustrating a typical operation of the present invention.

The unit is then left in the answer mode. Upon receiving a call (detecting rings), the TAD puts the telephone line in an off-hook state (Block 500, FIG. 11) and plays the outgoing message to the caller (Block 510).

If, for example, Regis Lamb were the fourth caller since the messages were last cleared, he would enter his home phone number, as requested by the OGM (Block 520). The microcontroller records the decoded identifying information in memory section 2, along with the available message number, in this case "5", as shown in FIG. 7. The microcontroller then searches all of the phone numbers stored in the database and matches the received phone number to the stored data record and recalls Mr. Lamb's for display as message 4 (Block 530) This is shown on the example display in FIG. 9. The microcontroller also records Mr. Lamb's voice message as message number 5 (FIG. 8), linking that voice message with the recalled data record through the list in memory section 2.

Later, the user would come home and press, for example, the "Display New Messages" key to see a list of the messages as shown in FIG. 9. By pressing on Mr. Lamb's name on the touch screen or the corresponding keypad number, only the fourth message would be played back from the proper location in memory, avoiding having to hear any other unwanted messages (block 540, 550). Simultaneously, the entire data record matching Mr. Lamb could also be displayed on the display while the voice message is being played back (Block 560), as shown in FIG. 10.

By merely pressing, "Return Call," the microprocessor would retrieve the phone number from the data record and produce the DTMF tones on the telephone line to dial Mr. Lamb. If more than one phone number appears on Mr. Lamb's data display, the touch screen or corresponding keypad number could be used to select and then dial any of the numbers (Block 570, 580).

While the embodiments shown and described are fully capable of achieving the objects of the invention, it is to be understood that these embodiments are shown only for the purpose of illustration and not for the purpose of limitation.

What is claimed is:

1. A telephone answering device coupled to a telephone line for automatically answering incoming telephone calls and storing and retrieving information from the incoming telephone calls comprising:

means for storing a predetermined list of names and associated stored identifying information;

means for receiving first signals from said telephone line, each of said first signals specifying a particular one of a plurality of callers;

means for receiving a voice message from each of said callers on said telephone line and storing said voice message.

means for converting each of said received first signals into received identifying information;

means for linking each received identifying information with the corresponding voice message;

means for comparing each received identifying information with said predetermined list;

means cooperating with said comparing means for simultaneously displaying a plurality of callers' names whose respective received identifying information matches stored identifying information in said list; and means for allowing a user to select any one of the plurality of simultaneously displayed callers' names from said display means, said selecting means also automatically directly audibly retrieving the voice message associated with the selected caller's name without scrolling individually through either the displayed names or voice messages.

2. The telephone answering device as in claim 1, wherein said means for displaying is also adapted to simultaneously display the corresponding caller's name and associated stored identifying information when the voice message associated with the selected caller is audibly retrieved.

3. The telephone answering device as in claim 1 further comprising input means with a plurality of alphanumeric and function keys for controlling the inputting and retrieval of information from said device.

4. The telephone answering device as in claim 3 including means cooperating with said input means for automatically dialling a caller's number in response to being actuated by the user.

5. The telephone answering device as in claim 4 wherein said number is automatically retrieved from said stored identifying information.

6. The telephone answering device as in claim 3 in which said device is incorporated in a telephone instrument, said input means performing the combined functions of dialling telephone numbers and controlling said device.

7. The telephone answering device as in claim 1 in which said device contains a display means for visually displaying stored identifying information and received identifying information.

8. The telephone answering device as in claim 1 including means for printing out callers' names.

9. The telephone answering device as in claim 1 including means for storing the time of incoming calls.

10. The method of automatically answering incoming telephone calls and storing and retrieving information from the incoming telephone calls with a telephone answering device having a memory which is coupled to a telephone instrument comprising the steps of:

storing a predetermined list of names and associated stored identifying information in said memory;

receiving signals specifying the caller of each incoming call;

receiving a voice message from the caller and storing it in said memory;

converting said received signals into received identifying information;

comparing said received identifying information with said predetermined list and displaying the caller's name if the received identifying information matches any stored identifying information identical in said predetermined list;

displaying simultaneously a plurality of callers' names whose respective received identifying information matches stored identifying information in said list;

linking each displayed caller's name with its corresponding voice message;

selectively directly retrieving the voice message corresponding to any one of the displayed caller's names by selecting that caller's name without scrolling through either said displayed names or voice messages.

11. A method as in claim 10, further comprising the step of simultaneously displaying the corresponding caller's name and stored identifying information when the voice message associated with the selected caller's name is audibly retrieved.

12. A telephone answering device coupled to a telephone line for automatically answering incoming telephone calls and storing and retrieving information from the incoming telephone calls, comprising:

means for receiving a signal having an identifier from said telephone line identifying the caller of an incoming call;

means for receiving a voice message from said caller and storing said voice message;

means for linking said identifier with the corresponding voice message;

means for displaying the identifiers for a plurality of incoming calls; and means for selecting any one of the identifiers from said display and audibly directly retrieving the voice message linked to the selected identifier without scrolling through individual displayed identifiers.

13. A telephone answering device coupled to a telephone line for automatically answering incoming telephone calls and storing and retrieving information from the incoming telephone calls comprising:

a microcomputer having a read only member (ROM) for providing a program for said microcomputer, a random access memory (RAM) with a plurality of storage sections therein and peripheral interface means for coupling peripheral means to said microcomputer;

a keyboard means having a plurality of alphanumeric and function keys coupled to said microcomputer by said peripheral interface means;

an alphanumeric display means mounted on said device and coupled to said microcomputer by said peripheral interface means;

said RAM having a predetermined list of names and associated identifying information stored therein in a first memory section thereof;

an analogue telephone interface system coupled between said telephone line and said microcomputer having a line seizing means for connecting said device to said telephone line after a predetermined number of rings;

a telephone signal converter means coupled between said telephone line and said microcomputer for converting a telephone number transmitted over the telephone line into digital form understandable by said microcomputer;

a voice recording means coupled between said telephone line and said microcomputer for receiving and storing in digital form a voice message in a second memory section of said RAM;

said microcomputer comparing converted incoming telephone numbers with said list stored in said first memory section of said RAM;

means for displaying a caller's name and said incoming telephone numbers which the caller's transmitted telephone number corresponds to a telephone number previously stored in said first memory section, said means for displaying cooperating with said microcomputer and simultaneously displaying a plurality of caller's names;

means for linking each caller's name to its associated voice message;

means for allowing a user to select any one of the simultaneously displayed caller's names and for simultaneously audibly retrieving the voice message associated with the selected caller's name from said second memory section without scrolling through individual displayed names or stored voice messages.

14. A telephone answering device as in claim 13 wherein said means for displaying is also adapted to display a caller's name and stored identifying information when the linked voice message is audibly retrieved.

* * * * *